Aug. 17, 1954  J. G. SCHURTER  2,686,365
ORTHODONTIC DEVICE
Filed March 10, 1953
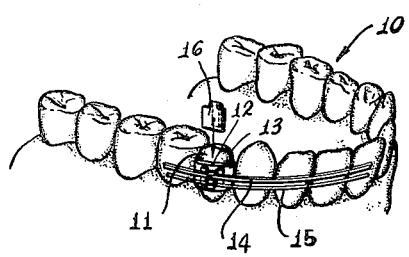
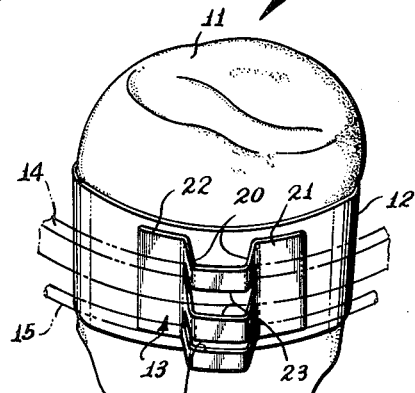
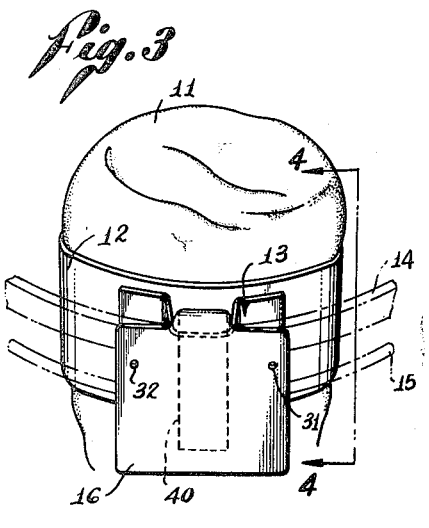
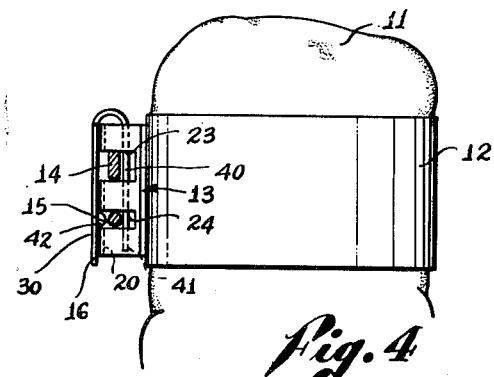
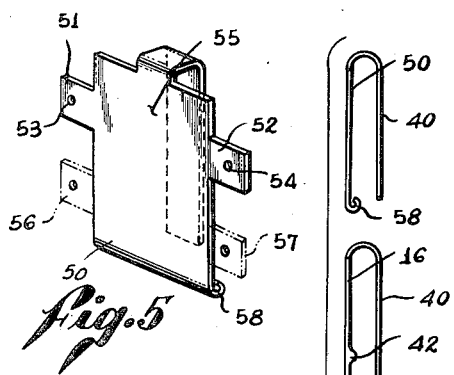
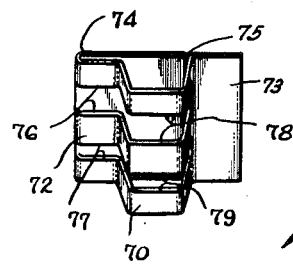
INVENTOR.
JOSEPH G. SCHURTER
BY Fulwider, Mattingly & Babcock
Attorneys Patented Aug. 17, 1954

2,686,365

UNITED STATES PATENT OFFICE 2,686,365

ORTHODONTIC DEVICE

Joseph G. Schurter, Chatsworth, Calif.

Application March 10, 1953, Serial No. 341,547

7 Claims. (Cl. 32—14)

This invention relates to orthodontic devices, and is particularly directed to a novel locking pin and bracket combination useful for securing arch wires and the like to a patient's teeth.

Heretofore brackets employed for supporting arch wires in the treating of a patient's teeth are generally fixed to metallic bands surrounding individual teeth in a patient's mouth. The arch wires or other dental appliances secured to these brackets are tensioned or biased in such a manner as to apply forces to the particular teeth to which the brackets are secured. In the actual securing of the arch wires, there is usually provided a notch means in the bracket into which the wire is fitted, and then a fastening means in the form of a ligature wire for locking the arch wire in place in the bracket.

Not only have such brackets been unsightly, but they are constructed in a manner which makes the insertion of the arch wires difficult. Additionally, the fastening means are often of such a nature that they will cut into the lower gingival tissue of the patient, causing soreness and much discomfort. Furthermore, when it is desired to exert different types of forces, such as a rotational moment, for example, on the particular tooth to which the band is secured, it is necessary to remove the entire bracket and band, and insert or affix to the tooth a new type of bracket having suitable projections to which springs and the like may be affixed for applying the new forces.

It is an object of the present invention to provide a vastly improved type of bracket and locking pin for locking arch wires thereto, which overcomes the above noted objections.

More particularly, an object of the invention is to provide a bracket in which at least two arch wires may be readily inserted and easily locked in place by a single pin element which will not irritate the gum tissue of the patient.

Another object is to provide a locking pin in combination with such a bracket which, when in locking position, will eclipse the bracket itself whereby the unsightly securing of the arch wires is not visible.

A more specific object of the invention is to provide a novel pin which serves the combined functions of locking arch wires in place on the bracket, and also provides a means for securing springs or other dental appliances to the pin itself whereby forces to be exerted on the particular tooth are exerted through the medium of the pin. Realization of this latter object permits several different pins to be used with the same bracket. Thus, when it is desired to exert different types of forces in different directions on a particular tooth, it is only necessary to remove the pin and replace it by another, rather than remove the whole bracket and tooth band.

These and additional objects and advantages of the invention are attained by providing a bracket comprising a channeled member having laterally extending flanges for securing the member to a dental band. The channel is open at its ends and defines at least two transverse slots forming side and front openings in the channel adapted to receive arch wires. This construction permits the arch wires to be inserted from the front; that is, to be simply pushed into the channel.

The locking pin element comprises a front face having a width at least equal to the width of the channel, and preferably greater, and a rearward leg secured to the front face of the pin at its upper end and extending parallel to the back surface of the front face. This rear leg of the locking pin is adapted to fit within the channel and hold the inserted arch wires in place while the front face lies over the front of the bracket and effectively eclipses the entire bracket from view. The rear portion of the front face of the pin may include a projection adapted to fit in one of the channel slots or under the lower edge of the channel, to lock the pin in place. This front face portion of the pin may also include ears to which suitable dental appliances may be affixed. The rear leg of the pin is preferably of a length such that it will not project from the lower end of the channel and therefore will not irritate the lower gingival portions of the patient's gums.

A clearer understanding of the invention will be had by referring to the accompanying drawings, in which:

Figure 1 illustrates in perspective the bracket element secured to one of a series of teeth and the cooperating pin element separated therefrom but ready for insertion;

Figure 2 shows in perspective a greatly enlarged view of the bracket member secured to a band about a patient's tooth;

Figure 3 is a perspective view similar to Figure 2 showing the appearance of the orthodontic device when the locking pin is in place;

Figure 4 is a side view as seen along the line 4—4 of Figure 3;

Figure 5 is a perspective view of a different type of locking pin;

Figure 6 shows in side view three different types of locking means for the pin; and Figure 7 is a perspective view of a modified type of bracket.

In Figure 1, there is shown a complement of teeth designated generally by the numeral 10, one of which, 11, includes a dental band 12. Fixed to the front face of the dental band 12, as by soldering for example, is a bracket member 13 supporting arch wires 14 and 15. A locking pin element 16 for securing the arch wires in place is shown above the bracket 13 just prior to insertion in the bracket. This pin element is adapted to simply slide down into the bracket with the front face of the pin lying over the bracket, in the direction indicated by the arrow.

As shown in more detail in Figure 2, the bracket member 13 is bent to define a channel 20 and two laterally oppositely extending flanges 21 and 22, these flanges serving as a support means for securing the bracket to the tooth band 12. Two transverse slots 23 and 24 are cut respectively across the channel 20 to provide side and front openings permitting the arch wires 14 and 15 to be inserted therein from the front. Slot 23 is of somewhat greater width than slot 24 to accommodate a different type of arch wire, such as the wire 14 of rectangular cross-section. Narrower slot 24 may conveniently be used for securing a smaller, round type arch wire.

Referring now to Figures 3 and 4, it will be noted that when the pin element 16 is inserted in the bracket 13, the points of attachment of the arch wires 14 and 15 within the slots 23 and 24, respectively, are completely eclipsed by the front face 30 of the pin. The relatively large area of the front face 30 is an important feature of this invention. First of all, this large area covers the unsightly bracket and bracket slots, and secondly, it provides a wide surface to which other dental appliances may be attached, as through the openings 31 and 32 for example. The relatively wide separation of the points 31 and 32, as permitted by the large width of the front face 30, permits a rotational torque to be applied to the bracket and thus the tooth 11 of greater magnitude than would otherwise be had by the attachment of such dental appliances to the bracket itself.

As shown in Figure 4, the pin 16 includes a rearwardly depending leg 40 adapted to fit within the channel 20 of the bracket 13. This rear leg is of narrower width than the front face whereby it will easily slide within the channel. The rear leg may either slide in behind the arch wires 14 and 15 as shown in Figure 4, or if preferred, the rear leg may be arranged to pass in front of these arch wires to press the arch wires directly against the tooth band 12. It will also be noted in Figure 4 that the length of the rearward depending leg 40 terminates at 41, just short of the end of the channel 20, thereby avoiding any sharp ends which might otherwise dig into the lower gum about the tooth 11.

The pin 16, as shown in Figure 4, is provided with a projection in the form of a dimple 42 adapted to fit within the lower slot 24, when the pin is pushed down into position, to lock the pin in place.

Figure 5 shows in perspective a modified type of pin which may, for example, be substituted for the pin 16 shown in Figure 3. As shown in Figure 5, the pin 50 includes laterally extending ears 51 and 52 having suitable openings 53 and 54 for the attachment of springs or ligatures. By providing these extended ears on the front face 55 of the pin 50, there can be exerted a much greater rotational force on the pin than could be exerted in the case of the pin 16 in Figure 3 because of the great spacing between the points of attachment at 53 and 54. The positioning of these ear projections is determined by the particular operation it is desired to effect. For example, it may be desired to exert forces near the base of the tooth, in which case suitable ears could be provided at the lower end of the front face 50 as shown in dotted lines at 56 and 57. Thus different types of forces may be applied to the tooth 11 without the necessity of removing the tooth band 12 and bracket 13. It is only necessary to remove one pin and replace it by another of a different type.

Rather than a dimple type projection for registering with one of the slots 23 or 24 in the bracket for locking the pin in place, the pin element of Figure 5 is provided with a smoothly rolled lower edge as at 58, which is adapted to abut the under lower edge of the channel. One of the advantages of such a rolled lower edge is that manufacture of the pin is simplified in that it is not necessary to provide a separate projection.

In Figure 6 there is shown in side view the pins 16 and 50 of Figures 4 and 5, respectively, and also a further modified type of pin 60. Rather than a rolled lower edge as at 58 on the pin 50, or a dimple 42 as on the pin 16, there may be provided, if desired, an enlarged projection 61 on the upper portion of the inside surface of the front face of the pin 60, dimensioned to fit snugly within the upper wider slot 23 of the bracket. This larger projection 61 will provide a somewhat more secure locking means by virtue of its larger area of contact with the slot edges, and for certain purposes may be more advantageous than the other locking means.

Figure 7 shows a modified type of bracket element which may be substituted for the bracket 13 of Figures 1 through 4. In this modified bracket, there is provided a flat strip of metal 70 bent in such a manner as to define a channel 71 and a pair of laterally extending flanges 72 and 73, as in the case of the manufacture of the bracket 16. One of the laterally extending flanges, such as 72 for example, however, is bent back on itself as at 74, and extends in the reverse direction to cover the channel 71. It then terminates at the beginning of the flange 73 as at the point 75. The top metallic layer of the flange 72, which is now of double thickness, is cut as at 76 and 77, to provide slotted portions forming continuations of the slots 78 and 79 in the channel 71.

In employing the bracket of Figure 7, the arch wires, such as the wires 14 and 15 shown in Figure 4, are pressed back against the rearward extending flange portion by passing the rearward leg of the corresponding pin in front of the arch wires. So positioning the pin in this manner will urge the arch wires into the extension slots 76 and 77 whereby a greater transverse edge length of the bracket will bear against the arch wires. This feature provides a more secure attachment for the arch wires to the bracket, and any rotational or torque moment applied to the arch wires themselves will be more efficiently communicated to the tooth band to which the bracket is affixed.

It is to be understood, of course, that any of the pins such as shown in Figures 5 and 6, may be used with the bracket of Figure 7.

By means of the present invention accordingly, I have provided a greatly improved type of pin and bracket in which it is very simple to insert arch wires, this operation being effected by merely pushing the arch wires into the slots from the front. The locking pin feature of the invention also eliminates the need for complicated securing means for arch wires such as ligature wires which present sharp edges. Furthermore, the provision of the wide front face on the locking pin completely eclipses the unsightly appearance of such brackets, and more importantly, provides a novel means for exerting certain forces in specified directions on the tooth. The fact that this locking pin is of such construction as to permit further dental appliances to be secured to it rather than to the bracket or to the band permits a far greater latitude in the number of operations that can be effected on any one tooth, inasmuch as it is only necessary to remove a pin and replace it by another, and the arduous task of removal of the whole band and bracket, as has prevailed in the past, is completely avoided.

Modifications within the spirit of the present invention will occur to those skilled in the art. The orthodontic device is therefore not to be thought of as limited to the precise embodiments disclosed.

I claim:

1. In an orthodontic device, a pin element adapted to be secured to a channeled bracket affixed to a dental band, said pin having an elongated front face of width sufficient to eclipse at least the channeled portion of said bracket and length at least equal to the length of said channeled bracket; a rearwardly disposed leg secured to an edge of said front face and extending in spaced parallel relation to the back surface of the front face, said leg having a width substantially less than the width of said front face and adapted to be secured in said bracket, the rear surface of said front face including a projection directed rearwardly to abut an edge portion of said channeled bracket to lock said pin to said bracket; and means on said front face for securing dental appliances thereto.

2. In an orthodontic device, a pin element adapted to be secured to a channeled bracket affixed to a dental band, said pin having an elongated front face of width sufficient to eclipse at least the channeled portion of said bracket and length at least equal to the length of said channeled bracket; a rearwardly disposed leg secured to an edge of said front face and extending in spaced parallel relation to the back surface to the front face, said leg having a width substantially less than the width of said front face and adapted to be secured to said channeled bracket; and ears projecting from said front face for securing dental appliances thereto.

3. In an orthodontic device including a channeled bracket adapted to be secured to a dental band and having a transverse slot adapted to receive a dental wire: a locking pin element having a front face of width at least sufficient to eclipse the channeled portion of said bracket and a length at least equal to the length of said channeled bracket, a rearwardly disposed leg secured to the upper portion of said front face and depending downwardly substantially parallel to the rear surface of the front face, said leg being spaced from the rear surface and adapted to be received within the channeled bracket, and ears on said front face comprising projections extending laterally of the longitudinal edges of the front face and in the plane of said face, permitting attachment of dental appliances thereto for exerting a rotational force on said front face about an axis substantially normal to said face.

4. In an orthodontic device, a bracket comprising a channel member having laterally extending flanges for securing the member to a dental band, said channel being open at its ends and defining at least two transverse slots forming side and front openings in the channel, one of said laterally extending flanges being bent back on itself to form a double thickness flange and extending a distance in the opposite direction to close the channel, front portions of the double thickness channel formed by the bending back being removed adjacent said open slot sides to form slots continuing to said flange edge.

5. In an orthodontic device, a bracket comprising a channel member having laterally extending flanges for securing the member to a dental band, said channel being open at its ends and defining at least two transverse slots forming side and front openings in the channel adapted to receive dental wires, a pin element having a front face of width at least equal to the width of said channel, and a rearward depending leg secured at its upper end to the center top of the front face and adapted to fit within said channel, the length of the channel being at least equal to the length of the depending leg, and a projection extending inwardly from the inside surface of said front face positioned to abut an edge of said channel to lock said pin element in place.

6. A device according to claim 5, in which said projection is formed at the bottom of said front face to abut the lower end of said channel.

7. A device according to claim 5, in which said projection is positioned to fit within one of said channel front openings.

References Cited in the file of this patent

UNITED STATES PATENTS

| Number | Name | Date |
|---|---|---|
| 1,304,721 | Young | May 27, 1919 |
| 1,369,665 | Johnson | Feb. 22, 1921 |
| 2,257,069 | Peak | Sept. 23, 1941 |